United States Patent
Tang et al.

(10) Patent No.: US 12,280,697 B2
(45) Date of Patent: Apr. 22, 2025

(54) LOW-POSTURE ZERO-GRAVITY SEAT FRAME CAPABLE OF BEING ADJUSTED IN MULTIPLE DIRECTIONS

(71) Applicant: MAGNA SEATING RESEARCH & DEVELOPMENT (CHONGQING) CO., LTD., Chongqing (CN)

(72) Inventors: Jiang Tang, Chongqing (CN); Peng Qin, Chongqing (CN); Jie He, Chongqing (CN); Shulin Li, Chongqing (CN)

(73) Assignee: MAGNA SEATING RESEARCH & DEVELOPMENT (CHONGQING) CO., LTD., Chongqing (CN)

( * ) Notice: Subject to any disclaimer, the term of this patent is extended or adjusted under 35 U.S.C. 154(b) by 304 days.

(21) Appl. No.: 18/095,494

(22) Filed: Jan. 10, 2023

(65) Prior Publication Data
US 2023/0202357 A1 Jun. 29, 2023

Related U.S. Application Data

(63) Continuation of application No. PCT/CN2022/117027, filed on Sep. 5, 2022.

(30) Foreign Application Priority Data

Dec. 28, 2021 (CN) .......................... 202111630386.0

(51) Int. Cl.
*B60N 2/16* (2006.01)
*B60N 2/235* (2006.01)
(Continued)

(52) U.S. Cl.
CPC ........... *B60N 2/235* (2013.01); *B60N 2/1695* (2013.01); *B60N 2/68* (2013.01); *B60N 2/688* (2013.01);
(Continued)

(58) Field of Classification Search
CPC ............ B60R 22/34; B60R 2022/3402; B60N 2/1695; B60N 2/688
See application file for complete search history.

(56) References Cited

U.S. PATENT DOCUMENTS

| | | | | |
|---|---|---|---|---|
| 10,933,821 | B2 * | 3/2021 | Line | ........................ A61L 2/10 |
| 11,027,683 | B1 * | 6/2021 | Palazzolo | ............... B60R 21/08 |
| 2017/0015221 | A1 | 1/2017 | Spangler et al. | |

FOREIGN PATENT DOCUMENTS

| | | |
|---|---|---|
| CN | 203974743 U | 12/2014 |
| CN | 105459857 A | 4/2016 |

(Continued)

*Primary Examiner* — Timothy J Brindley

(57) ABSTRACT

Disclosed is a low-posture zero-gravity seat frame capable of being adjusted in multiple directions. A first left front connecting rod has a lower end hinged to a left slide rail front bracket and an upper end hinged to one end of a second left front connecting rod, and the other end of the second left front connecting rod is hinged to a front horizontal tube. A second toothed plate driving device is able to adjust the height of a seat framework through the movement of a rear horizontal tube. A seatbelt retractor is disposed below the seat framework. The seat frame can realize zero-gravity adjustment, occupies a small space, and can fulfill low-posture seat arrangement.

10 Claims, 5 Drawing Sheets

(51) Int. Cl.
  *B60N 2/68* (2006.01)
  *B60N 2/90* (2018.01)
  *B60R 22/34* (2006.01)
  *B60N 2/02* (2006.01)

(52) U.S. Cl.
  CPC .............. *B60N 2/995* (2018.02); *B60R 22/34* (2013.01); *B60N 2/02246* (2023.08)

(56) References Cited

FOREIGN PATENT DOCUMENTS

| | | | | |
|---|---|---|---|---|
| CN | 209176548 U | 7/2019 | | |
| CN | 110370998 A | 10/2019 | | |
| CN | 111391735 A | 7/2020 | | |
| CN | 112537329 A | 3/2021 | | |
| CN | 213109108 U | 5/2021 | | |
| CN | 113147531 A | * | 7/2021 | ........... B60N 2/1803 |
| CN | 214355644 U | 10/2021 | | |
| CN | 113771705 A | 12/2021 | | |
| CN | 114179688 A | 3/2022 | | |
| CN | 216636231 U | 5/2022 | | |
| CN | 216636262 U | 5/2022 | | |
| DE | 102006060179 A1 | * | 8/2007 | ........... B60N 2/0232 |
| DE | 102019122252 A1 | * | 2/2020 | ............. B60N 2/688 |
| DE | 102019124618 A1 | * | 3/2020 | ................ B60N 2/10 |
| EP | 1440840 A2 | * | 7/2004 | ............. B60N 2/242 |
| KR | 20130097837 A | 9/2013 | | |

\* cited by examiner

LOW-POSTURE ZERO-GRAVITY SEAT FRAME CAPABLE OF BEING ADJUSTED IN MULTIPLE DIRECTIONS

BACKGROUND OF THE INVENTION

1. Technical Field

The invention relates to the technical field of automobile seats, in particular to a low-posture zero-gravity seat frame capable of being adjusted in multiple directions.

2. Description of Related Art

At present, new energy vehicles, which are powered by a battery pack, have become the mainstream development trend of the automobile industry. The battery pack may be arranged in various ways, but in most cases, the battery pack is disposed underneath the chassis of the vehicles, which will inevitably elevate the platform of the vehicles and narrow down the arrangement space of seats. Existing zero-gravity seats are typically driven by an electric recliner or a push rod. However, due to the fact that a cam structure is disposed in the electric recliner, the electric recliner will swing like waves during the moving process, leading to poor comfort; the push rod needs to be covered separately, which makes the cost high; and both the electric recliner and the push rod require a large installation space, which makes it impossible to realize low-posture seat arrangement.

In addition, the zero-gravity design brings some difficulties in design for some accessory structures of seats. For example, due to the large adjustment range, the seatbelt cannot effectively restrain passengers, and the safety of the passengers cannot be guaranteed in case of an emergency brake or collision. In view of this, the seatbelt retractor of zero-gravity seats must be installed on the seat body and cannot be installed on the car body like traditional seats. There have been seats with the seatbelt retractor being installed on the backrest framework on the present market. However, due to the fact that the retractor will not be locked when the angle is changed within 12° and will be locked when the angle is changed over 27°, the retractor disposed on the seatback will be locked when the seat is at a zero-gravity posture because the adjustment angle of the backrest framework is over 27°, and at this moment, the seatbelt cannot be pulled out to be used normally. Due to the fact that zero-gravity adjustment involves multiple rotation centers (rotation of the backrest, rotation of the cushion, rotation for height adjustment), a retractor with the backrest angle compensation function cannot be arranged in the prior art.

BRIEF SUMMARY OF THE INVENTION

To solve the above-mentioned problems, the invention aims to provide a low-posture zero-gravity seat frame capable of being adjusted in multiple directions. The angle and height of the seat framework can be adjusted to realize zero-gravity adjustment, and driving devices for angle and height adjustment occupy a small space, so low-posture seat arrangement can be realized; a seatbelt retractor of the seat framework can be disposed underneath a seat frame to avoid the influence of zero-gravity adjustment on the use of the seatbelt retractor; a leg rest of the seat framework can be elevated from a storage position to a use position and can also be extended to meet the requirements of different passengers, thus effectively relieving leg fatigue of passengers during a long ride.

To fulfill the above aim, the invention provides a low-posture zero-gravity seat frame capable of being adjusted in multiple directions, comprising a backrest framework, a seat framework, a left slide rail assembly and a right slide rail assembly, wherein the seat framework comprises two side plates, a front horizontal tube, a rear horizontal tube, and two seat basin brackets disposed on the front horizontal tube, a left slide rail front bracket and a left slide rail rear bracket are disposed on an upper slide rail of the left slide rail assembly, and a right slide rail front bracket and a right slide rail rear bracket are disposed on an upper slide rail of the right slide rail assembly; the low-posture zero-gravity seat frame further comprises a first left front connecting rod, a second left front connecting rod, a right front connecting rod and a right rear connecting rod, wherein a lower end of the first left front connecting rod is hinged to the left slide rail front bracket, an upper end of the first left front connecting rod is hinged to one end of the second left front connecting rod, the other end of the second left front connecting rod is hinged to the front horizontal tube, a lower end of the right front connecting rod is hinged to the right slide rail front bracket, a first toothed plate driving device is disposed between an upper end of the right front connecting rod and the front horizontal tube, and the first toothed plate driving device adjusts a dip angle of the seat framework through a movement of the front horizontal tube; a lower end of the right rear connecting rod is hinged to the right slide rail rear bracket, an upper end of the right rear connecting rod is fixedly connected to the rear horizontal tube, a second toothed plate driving device is disposed between the left slide rail rear bracket and the side plate on the left, and the second toothed plate driving device adjusts a height of the seat framework through a movement of the rear horizontal tube;

A seatbelt retractor is disposed below the seat framework and is fixed on the upper slide rails on the left and right through retractor fixing brackets, and seatbelt guide brackets are disposed on the seat framework and the backrest framework respectively, such that a seatbelt is wound backward across the rear horizontal tube and is then extended upward onto the backrest framework;

A leg rest is disposed at a front end of the seat framework and comprises two leg rest brackets, a lower support plate and an upper support plate, the two leg rest brackets are fixed on the two seat basin brackets respectively, and a leg rest cross-bar is rotatably disposed between the two leg rest brackets; two four-link mechanisms are oppositely disposed left and right sides of the leg rest cross-bar, and each comprise a first link, a second link, a third link and a fourth link, an upper end of the first link is fixedly connected to the leg rest cross-bar, a lower end of the first link is hinged to an upper end of the second link, the middle of the second link is hinged to the middle of the third link, the second link is hinged to the lower support plate, an upper end of the third link is hinged to the leg support bracket on the corresponding side, a lower end of the third link is hinged to an upper end of the fourth link, a lower end of the fourth link is hinged to the lower support plate, and two hinge points between each four-link mechanism and the lower support plate are spaced apart from each other; a first lead screw nut mechanism is disposed on the front horizontal tube and is hinged to a lower end of a driven rod, an upper end of the driven rod is fixedly connected to the leg rest cross-bar, and the first lead screw nut mechanism is able to drive the driven rod to rotate so as to drive the leg rest cross-bar to rotate, which in turn drives the four-link mechanism to move to drive the lower support plate to rise to a use position or be folded at a storage position; and a leg rest slide rail which extends forward and backward is disposed on the lower support plate, the upper support plate is slidably connected to the leg rest slide rail, and a second lead screw nut mechanism is disposed between the lower support plate and the upper support plate and is able to drive the upper support plate to move along the leg rest slide rail.

The invention has the following beneficial effects:

1. The dip angle and height of the seat frame can be adjusted to realize zero-gravity adjustment; driving devices for dip angle adjustment and height adjustment occupy a small space, such that low-posture seat arrangement can be realized, and the seat frame can be widely applied to new energy vehicles.

2. The zero-gravity adjustment device of traditional seats is disposed below the seat frame, thus occupying a large space and being not suitable for low-posture seat arrangement, and there is no space for installing the seatbelt retractor below the seat frame; the zero-gravity adjustment device in the invention occupies a small space below the seat frame, such that a sufficient installation space is reserved for the seatbelt retractor; the seatbelt retractor is fixed between two upper slide rails through retractor fixing brackets, such that the seatbelt retractor will not be affected when the seat frame turns, and the situation where the seatbelt retractor cannot work normally and is automatically locked due to an excessively large turning angle and a seatbelt cannot be pulled out is avoided.

3. The leg rest is disposed at the front end of the seat frame, and the leg rest can be lifted to a use position from a storage position through the cooperation of the first lead screw nut mechanism and the four-link mechanism, and can be extended through the second lead screw nut mechanism to meet the requirements of different passengers, such that leg fatigue of passengers during a long ride can be effectively relieved.

DETAILED DESCRIPTION OF THE INVENTION

Figure 1:
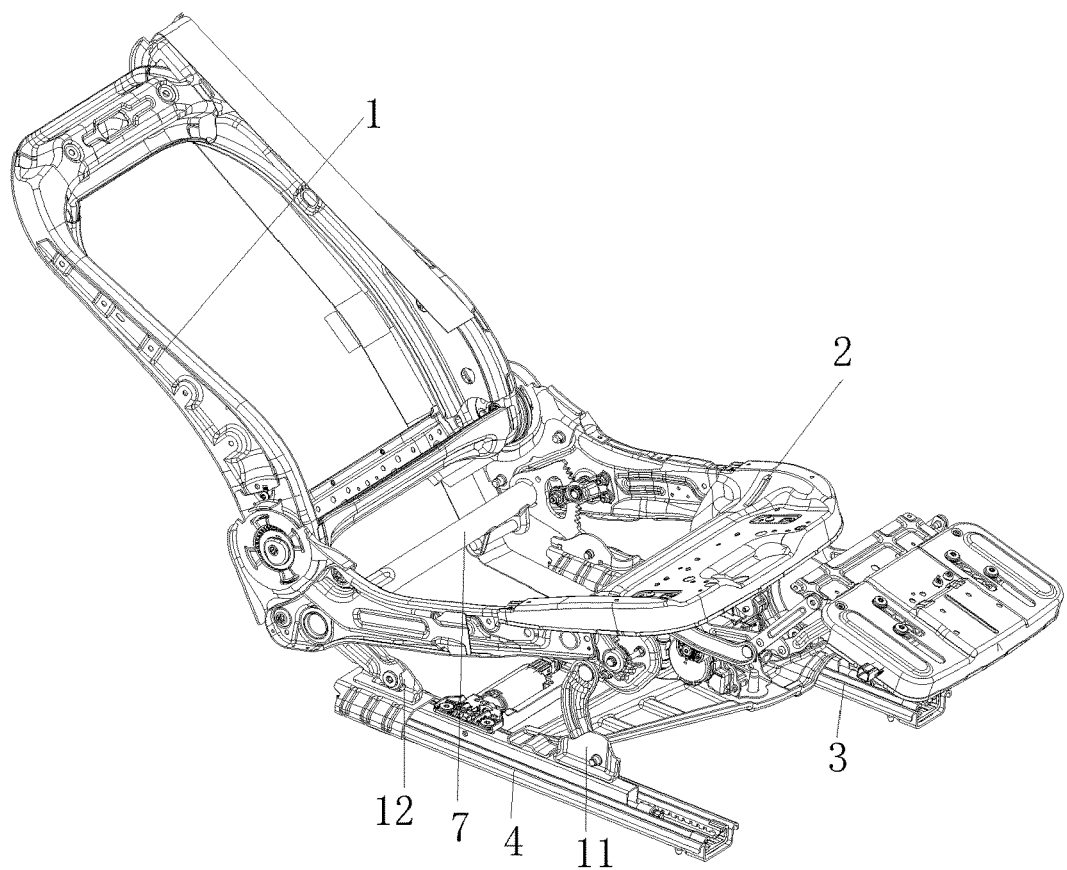
FIG. 1 is an overall structural view of the invention.
Figure 2:
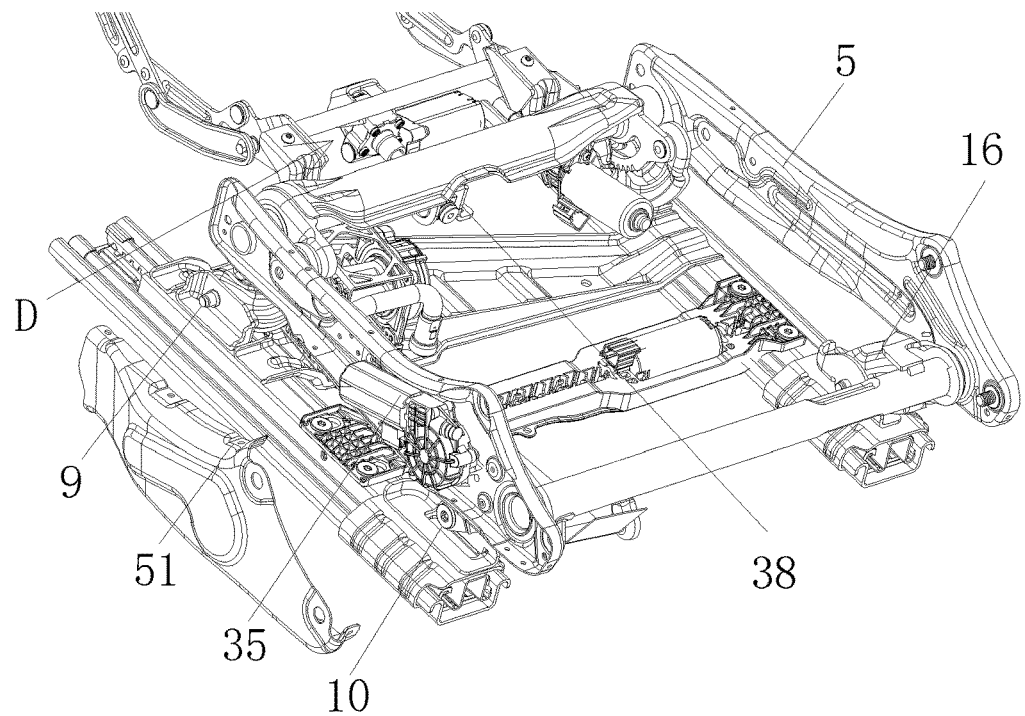
FIG. 2 is a schematic diagram of a seat framework.
Figure 3:
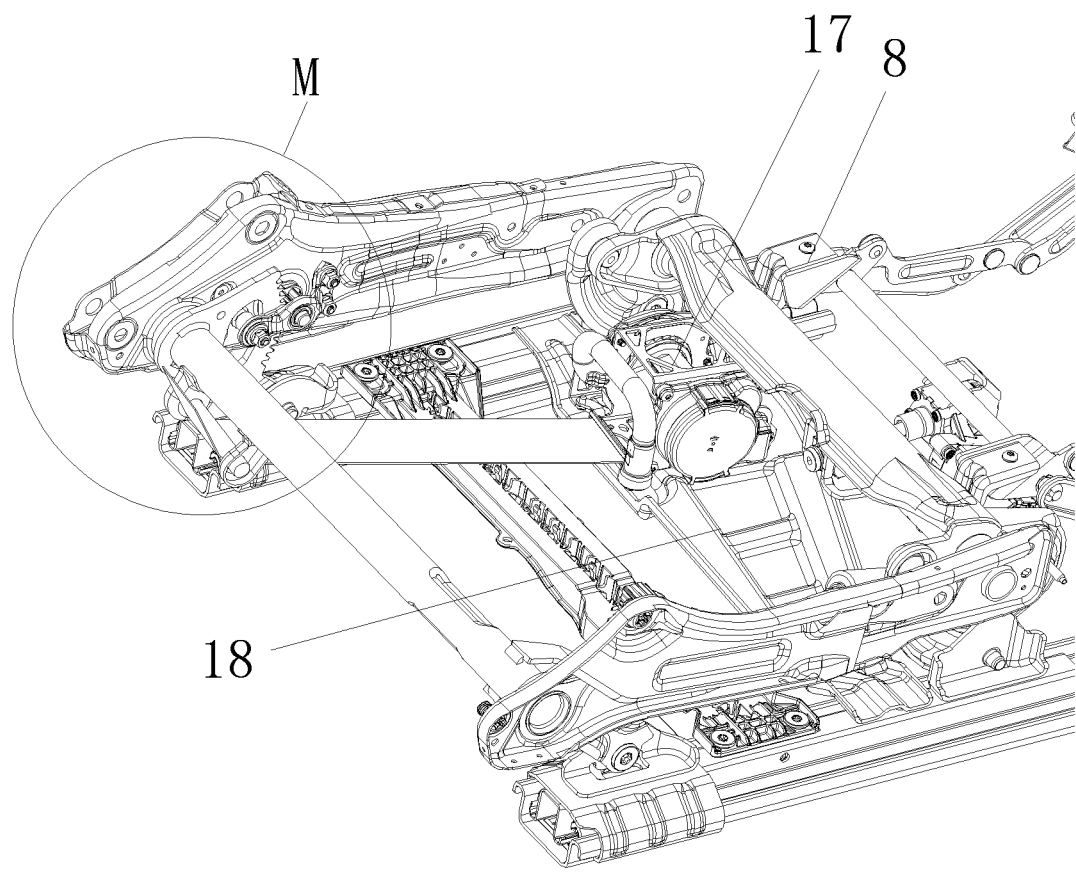
FIG. 3 is a schematic diagram of the seat framework from another perspective.
Figure 4:
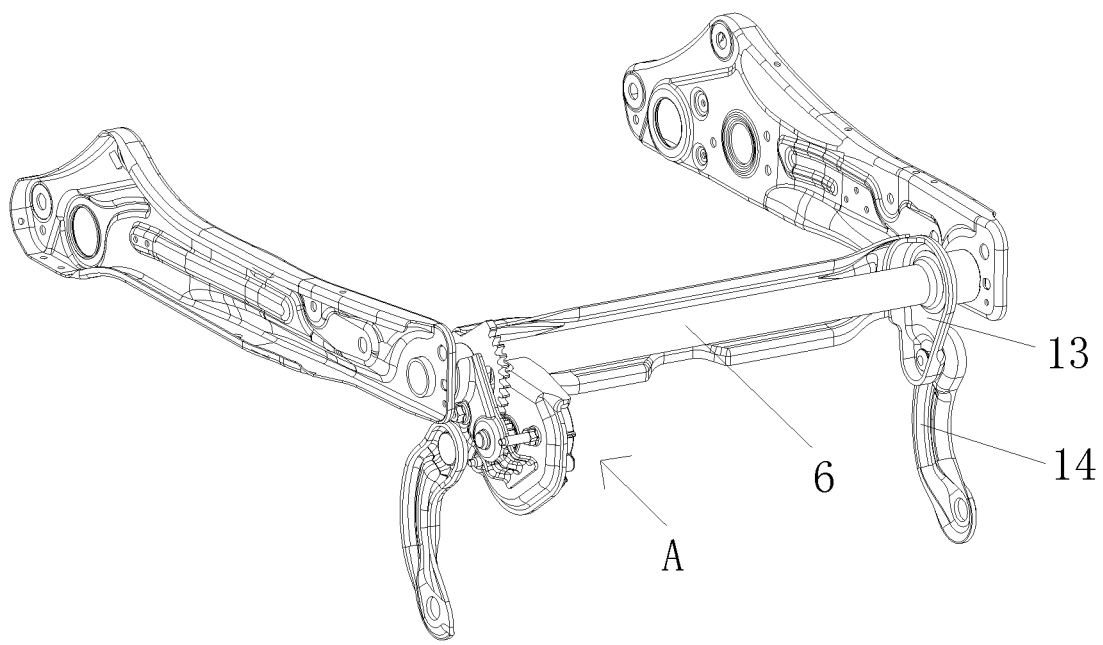
FIG. 4 is an assembled view of a first toothed plate driving device.
Figure 5:
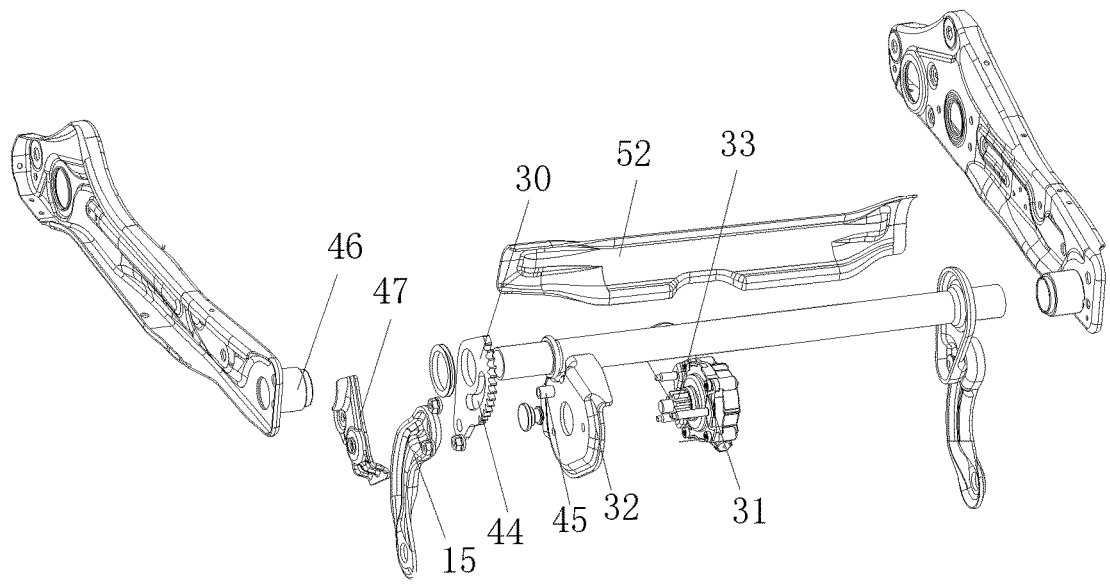
FIG. 5 is an exploded view of the first toothed plate driving device.
Figure 6:
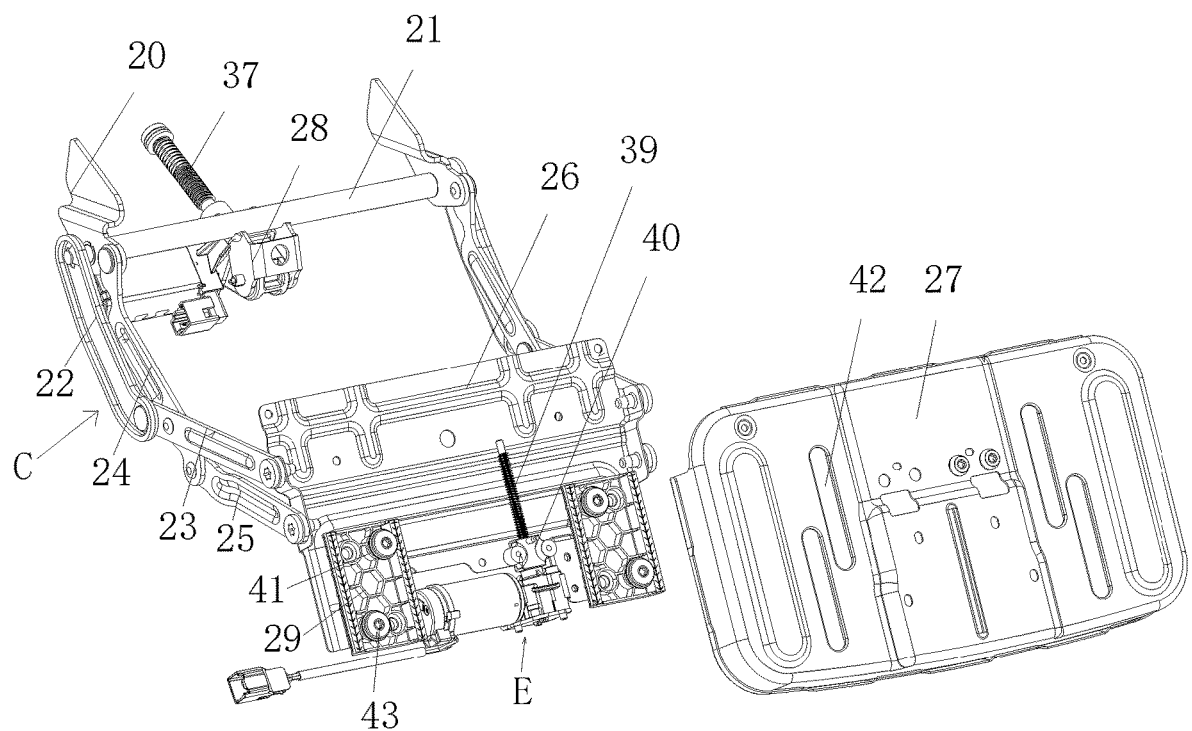
FIG. 6 is a structural diagram of a leg rest.
Figure 7:
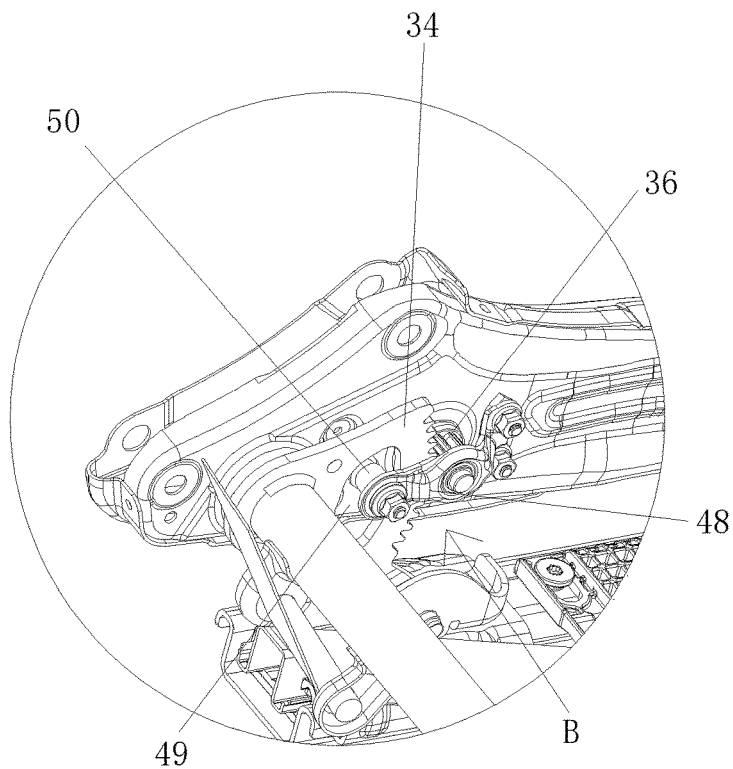
FIG. 7 is an enlarged view of part M in FIG. 3.
Figure 8:
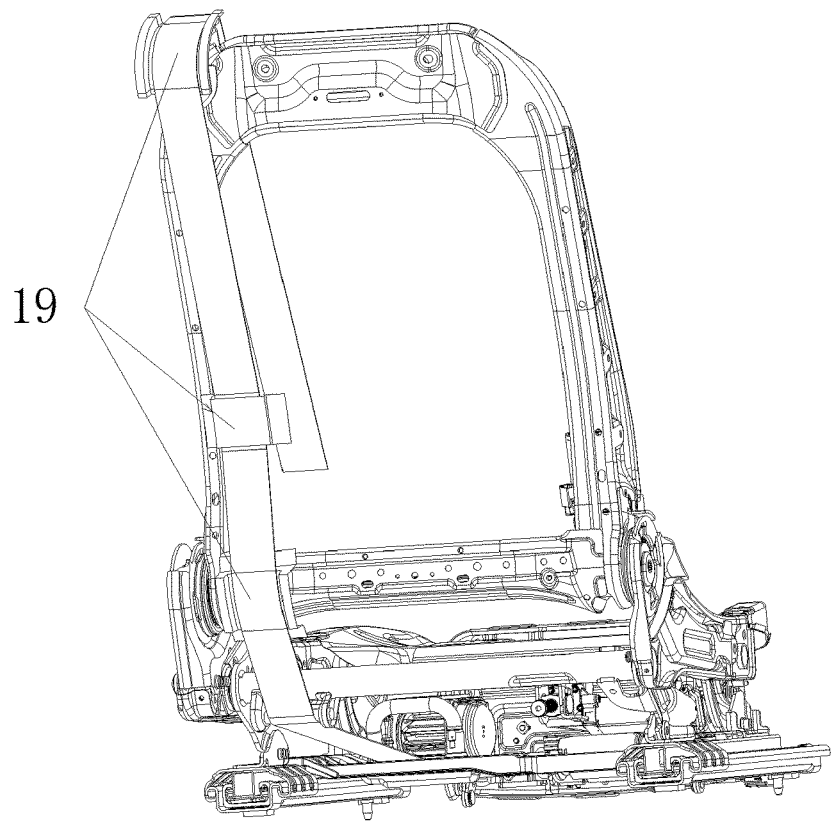
FIG. 8 is a rear view of the invention.
Figure 9:
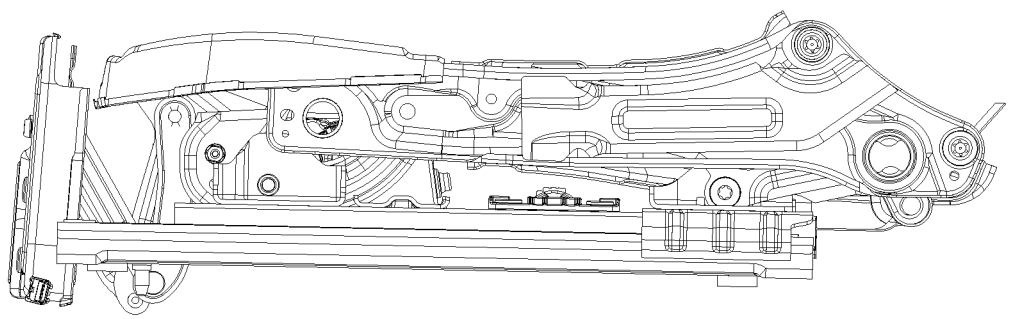
FIG. 9 is a schematic diagram of a seat frame adjusted to the lowest position.
Figure 10:
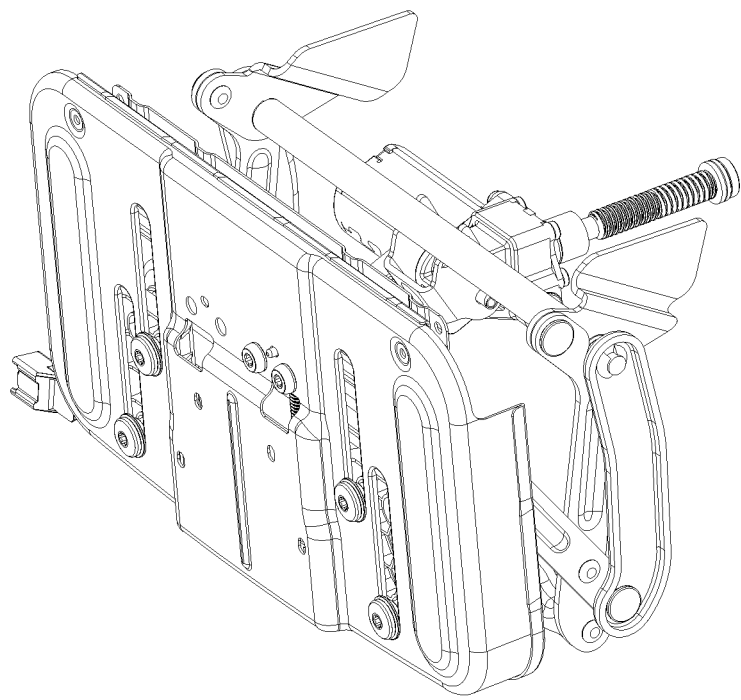
FIG. 10 is a schematic diagram of the leg rest in a folded state.

As shown in FIG. 1-FIG. 10, a low-posture zero-gravity seat frame capable of being adjusted in multiple directions is mainly composed of a backrest framework 1, a seat framework 2, a left slide rail assembly 3, and a right slide rail assembly 4. The seat framework 2 comprises two side plates 5, a front horizontal tube 6, a rear horizontal tube 7, and two seat basin brackets 8 disposed on the front horizontal tube 6, wherein a left slide rail front bracket 9 and a left slide rail rear bracket 10 are disposed on an upper slide rail of the left slide rail assembly 3, and a right slide rail front bracket 11 and a right slide rail rear bracket 12 are disposed on an upper slide rail of the right slide rail assembly 4.

A lower end of a first left front connecting rod 14 is hinged to the left slide rail front bracket 9, an upper end of the first left front connecting rod 14 is hinged to one end of a second left front connecting rod 13, and the other end of the second left front connecting rod 13 is hinged to the front horizontal tube 6. A lower end of a right front connecting rod 15 is hinged to the right slide rail front bracket 11, a first toothed plate driving device A is disposed between an upper end of the right front connecting rod 15 and the front horizontal tube 6, and the first toothed plate driving device A adjusts a dip angle of the seat framework 2 through the movement of the front horizontal tube 6. A lower end of a right rear connecting rod 16 is hinged to the right slide rail rear bracket 12, an upper end of the right rear connecting rod 16 is fixedly connected to the rear horizontal tube 7, a second toothed plate driving device B is disposed between the left slide rail rear bracket 10 and the side plate 5 on the left, and the second toothed plate driving device B adjusts the height of the seat framework 2 through the movement of the rear horizontal tube 7.

A seatbelt retractor 17 is disposed below the seat framework 2, and specifically, the seatbelt retractor 17 may be disposed below the front horizontal tube 6; the seatbelt retractor 17 is fixed on the upper slide rails on the left and right through retractor fixing brackets 18, and seatbelt guide brackets 19 are disposed on the seat framework 2 and the backrest framework 1 respectively, such that a seatbelt is wound backward across the rear horizontal tube 7 and is then extended upward onto the backrest framework 1.

A leg rest is disposed at a front end of the seat framework 2 and comprises two leg rest brackets 20, a lower support plate 26 and an upper support plate 27, wherein the two leg rest brackets 20 are fixed on the two seat basin brackets 8 respectively, and a leg rest cross-bar 21 is rotatably disposed between the two leg rest brackets 20. Two four-link mechanisms C are oppositely disposed left and right sides of the leg rest cross-bar 21. Each four-link mechanism C comprises a first link 22, a second link 23, a third link 24 and a fourth link 25, wherein an upper end of the first link 22 is fixedly connected to the leg rest cross-bar 21, a lower end of the first link 22 is hinged to an upper end of the second link 23, the middle of the second link 23 is hinged to the middle of the third link 24, the second link 23 is hinged to the lower support plate 26, an upper end of the third link 24 is hinged to the leg support bracket 20 on the corresponding side, a lower end of the third link 24 is hinged to an upper end of the fourth link 25, a lower end of the fourth link 25 is hinged to the lower support plate 26, and two hinge points between each four-link mechanism C and the lower support plate 26 are spaced apart from each other. A first lead screw nut mechanism D is disposed on the front horizontal tube 6 and is hinged to a lower end of a driven rod 28, an upper end of the driven rod 28 is fixedly connected to the leg rest cross-bar 21, and the first lead screw nut mechanism D is able to drive the driven rod 28 to rotate so as to drive the leg rest cross-bar 21 to rotate, which in turn drives the four-link mechanism C to move to drive the lower support plate 26 to rise to a use position or be folded at a storage position. A leg rest slide rail 29 which extends forward and backward is disposed on the lower support plate 26, the upper support plate 27 is slidably connected to the leg rest slide rail 29, and a second lead screw nut mechanism E is disposed between the lower support plate 26 and the upper support plate 27 and is able to drive the upper support plate 27 to move along the leg rest slide rail 29.

Preferably, the first toothed plate driving device A comprises a dip angle adjustment toothed plate 30 and a dip angle adjustment motor 31, wherein the dip angle adjustment motor 31 is fixed on the front horizontal tube 6 through a dip angle adjustment motor fixing bracket 32, and the front horizontal tube 6 is welded and fixed between the two side plates 5. An output shaft of the dip angle adjustment motor 31 is sleeved with a first driving gear 33, the dip angle adjustment toothed plate 30 is a fan-shaped plate, one end of the dip angle adjustment toothed plate 30 is hinged and installed on the front horizontal tube 6 through a center hole, an upper end of the right front connecting rod 15 is hinged to the other end of the dip angle adjustment toothed plate 30, arc-shaped teeth of the dip angle adjustment toothed plate 30 face forward, the first driving gear 33 is engaged with the dip angle adjustment toothed plate 30, and a dip angle adjustment connecting plate 52 is fixedly connected between the second left front connecting rod 13 and the dip angle adjustment toothed plate 30. Through the right front connecting rod 15 and the dip angle adjustment connecting plate 52, the left side and right side of the seat framework 2 can rotate synchronously; because a multi-link mechanism is formed by the first toothed plate driving device A and the seat framework, when the dip angle adjustment motor 31 drives the first driving gear 33 to rotate, the first driving gear 33 can drive the dip angle adjustment toothed plate 30 to rotate around the front horizontal tube 6, the right front connecting rod 15 is driven to rotate when the dip angle adjustment toothed plate 30 rotates, and the dip angle adjustment toothed plate 30 and the right front connecting rod 15 rotate synchronously to adjust the height position of the front horizontal tube 6, such that the dip angle of the seat framework 2 is adjusted. The first toothed plate driving device A is composed of the simple toothed plate and the motor, so a small space is occupied, the dip angle can be adjusted, low-posture seat arrangement can be realized under the precondition of fulfilling dip angle adjustment, and a sufficient installation space is reserved for the seatbelt retractor 17.

Preferably, the second toothed plate driving device B comprises a height adjustment toothed plate 34 and a height adjustment motor 35, wherein the height adjustment toothed plate 34 is a fan-shaped plate, one end of the height adjustment toothed plate 34 is welded and fixed on the rear horizontal tube 7 through a center hole, the rear horizontal tube 7 is hinged and installed between the two side plates 5, the other end of the height adjustment toothed plate 34 is hinged to the left slide rail rear bracket 10, and arc-shaped teeth of the height adjustment toothed plate 34 face forward. The height adjustment motor 35 is fixed on the side plate 5 on the left through a height adjustment motor fixing bracket, an output shaft of the height adjustment motor 35 is sleeved with a second driving gear 36, and the second driving gear 36 is engaged with the height adjustment toothed plate 34. Because a multi-link mechanism is formed by the second toothed plate driving device B and the seat framework, when the height adjustment motor 35 drives the second driving gear 36 to rotate, the second driving gear 36 can drive the height adjustment toothed plate 35 to drive the rear horizontal tube 7 to rotate with respect to the side plates 5, the height adjustment toothed plate 35 is driven to rotate around the left side rail rear bracket 10, and the height position of the rear horizontal tube 7 can be adjusted when the height adjustment toothed plate 35 rotates, such that the height of the seat framework 2 is adjusted. The second toothed plate driving device B is composed of the simple toothed plate and the motor, so a small space is occupied, and low-posture seat arrangement is realized under the precondition of fulfilling height adjustment.

Preferably, the first lead screw nut mechanism D is composed of a first electric lead screw 37 and a first nut 38, wherein the first nut 38 is fixed on the front horizontal tube 6, a screw rod of the first electric lead screw 37 is sleeved with the first nut 38, and a lower end of the driven rod 28 is hinged to a motor of the first electric lead screw 37. When the motor of the first electric lead screw 37 drives the screw rod to rotate, the first electric lead screw 37 moves linearly with respect to the first nut 38, to drive the driven rod 28 to rotate, which in turn drives the leg rest cross-bar 21 to rotate. Through the linkage between the first lead screw nut mechanism D and the driven rod 28, the leg rest cross-bar 21 can rotate to drive the leg rest to turn, and the structural design is ingenious; and the first electric lead screw 37 can be horizontally disposed below the seat framework 2 and occupies a small space in the height direction, such that low-posture seat arrangement can be realized.

Preferably, the second lead screw nut mechanism E is composed of a second electric lead screw 39 and a second nut 40, wherein an extension direction of a screw rod of the second electric lead screw 39 is identical with an extension direction of the leg rest slide rail 29, and the second nut 40 is disposed around the screw rod and is fixed on the upper support plate 27. When a motor of the second electric lead screw 39 drives the screw rod to rotate, the second nut 40 can move in the extension direction of the screw rod, such that the upper support plate 27 is driven to move forward and backward along the leg rest slide rail 29. The upper support plate 27 can move with respect to the lower support plate 26 through the simple lead screw nut mechanism, such that the leg rest can be extended to meet the requirements of different passengers.

Preferably, the leg rest slide rail 29 is a plastic slide rail, which is made of a plastic plate with honeycomb hollows, bolt holes 41 are formed in the plastic slide rail, guide holes 42 extending forward and backward are formed in the upper support plate 27, and connecting bolts 43 penetrate through the guide holes 42 to be fixed in the bolt holes 41, such that the upper support plate 27 and the plastic slide rail are slidably connected. The connecting bolts 43 can cooperate with the guide holes 42 to guide the movement of the upper support plate 27, and can also prevent the upper support plate 27 from being separated from the plastic slide rail.

Preferably, a first arc-shaped positioning hole 44 is formed in the dip angle adjustment toothed plate 30 and is concentric with the dip angle adjustment toothed plate 30, a first hinge pin 45 inserted into the first arc-shaped positioning hole 44 is disposed on the dip adjustment motor fixing bracket 32, and when the dip angle adjustment toothed plate 30 is driven to rotate, the first hinge pin 45 rotates along the first arc-shaped positioning hole 44. Through the cooperation of the first arc-shaped positioning hole 44 and the first hinge pin 45, the dip angle adjustment toothed plate 30 can be limited during turning, such that the situation where the dip angel adjustment toothed plate 30 is separated from the first driving gear 33 due to excessive turning is prevented.

Preferably, fixed shaft sleeves 46 are correspondingly welded to inner sides of the two side plates 5, two ends of the front horizontal tube 6 respectively penetrate through the two fixed shaft sleeves 46 to be welded to the corresponding side plates 5, one end of a dip angle adjustment motor electrolytic plate 47 is welded to the fixed shaft sleeve 46 on the right, the other end of the dip angle adjustment motor electrolytic plate 47 is fixed on the dip angle adjustment motor fixing bracket 32, the first driving gear 33 and the dip angle adjustment toothed plate 30 are engaged between the dip angle adjustment motor electrolytic plate 47 and the dip angle adjustment motor fixing bracket 32, a hole allowing the output shaft of the dip angle adjustment motor 31 to penetrate through is formed in the middle of the dip angle adjustment motor electrolytic plate 47, and the first hinge pin 45 is fixedly connected to the dip angle adjustment motor electrolytic plate 47 after penetrating through the first arc-shaped positioning hole 44. The dip angle adjustment motor electrolytic plate 47 can protect the first driving gear 33 and improve the engaging stability of the first driving gear 33 and the dip angle adjustment toothed plate 30.

Preferably, a second arc-shaped positioning hole 49 is formed in the height adjustment toothed plate 34 and is concentric with the height adjustment toothed plate 34, a second hinge pin 50 is disposed on the side plate 5 on the left and is inserted into the second arc-shaped positioning hole 49, and when the height adjustment toothed plate 34 is driven to rotate, the second hinge pin 50 rotates along the second arc-shaped positioning hole 49. Through the cooperation of the second arc-shaped positioning hole 49 and the second hinge pin 50, the height adjustment toothed plate 34 can be limited during turning, such that the situation where the height adjustment toothed plate 34 is separated from the second driving gear 36 due to excessive turning is prevented.

Preferably, a height adjustment motor electrolytic plate 48 covering the second driving gear 36 is disposed between a free end of the second hinge pin 50 and an inner side of the side plate 5 on the left, and a hole allowing the output shaft of the height adjustment motor 35 to penetrate through is formed in the middle of the height adjustment motor electrolytic plate 48. The height adjustment motor electrolytic plate 48 can protect the second driving gear 36 and improve the engaging stability of the second driving gear 36 and the height adjustment toothed plate 34.

What is claimed is:

1. A low-posture zero-gravity seat frame capable of being adjusted in multiple directions, comprising a backrest framework, a seat framework, a left slide rail assembly and a right slide rail assembly, the seat framework comprising two side plates, a front horizontal tube, a rear horizontal tube, and two seat basin brackets disposed on the front horizontal tube, a left slide rail front bracket and a left slide rail rear bracket being disposed on an upper slide rail of the left slide rail assembly, and a right slide rail front bracket and a right slide rail rear bracket being disposed on an upper slide rail of the right slide rail assembly, wherein:

the low-posture zero-gravity seat frame further comprises a first left front connecting rod, a second left front connecting rod, a right front connecting rod and a right rear connecting rod, a lower end of the first left front connecting rod is hinged to the left slide rail front bracket, an upper end of the first left front connecting rod is hinged to one end of the second left front connecting rod, the other end of the second left front connecting rod is hinged to the front horizontal tube, a lower end of the right front connecting rod is hinged to the right slide rail front bracket, a first toothed plate driving device is disposed between an upper end of the right front connecting rod and the front horizontal tube, and the first toothed plate driving device adjusts a dip angle of the seat framework through a movement of the front horizontal tube; a lower end of the right rear connecting rod is hinged to the right slide rail rear bracket, an upper end of the right rear connecting rod is fixedly connected to the rear horizontal tube, a second toothed plate driving device is disposed between the left slide rail rear bracket and the side plate on the left, and the second toothed plate driving device adjusts a height of the seat framework through a movement of the rear horizontal tube;

a seatbelt retractor is disposed below the seat framework and is fixed on the upper slide rails on the left and right through retractor fixing brackets, and seatbelt guide brackets are disposed on the seat framework and the backrest framework respectively, such that a seatbelt is wound backward across the rear horizontal tube and is then extended upward onto the backrest framework;

a leg rest is disposed at a front end of the seat framework and comprises two leg rest brackets, a lower support plate and an upper support plate, the two leg rest brackets are fixed on the two seat basin brackets respectively, and a leg rest cross-bar is rotatably disposed between the two leg rest brackets; two four-link mechanisms are oppositely disposed left and right sides of the leg rest cross-bar, and each comprise a first link, a second link, a third link, and a fourth link, an upper end of the first link is fixedly connected to the leg rest cross-bar, a lower end of the first link is hinged to an upper end of the second link, a middle of the second link is hinged to a middle of the third link, the second link is hinged to the lower support plate, an upper end of the third link is hinged to the leg support bracket on the corresponding side, a lower end of the third link is hinged to an upper end of the fourth link, a lower end of the fourth link is hinged to the lower support plate, and two hinge points between each said four-link mechanism and the lower support plate are spaced apart from each other; a first lead screw nut mechanism is disposed on the front horizontal tube and is hinged to a lower end of a driven rod, an upper end of the driven rod is fixedly connected to the leg rest cross-bar, and the first lead screw nut mechanism is able to drive the driven rod to rotate so as to drive the leg rest cross-bar to rotate, which in turn drives the four-link mechanism to move to drive the lower support plate to rise to a use position or be folded at a storage position; and a leg rest slide rail which extends forward and backward is disposed on the lower support plate, the upper support plate is slidably connected to the leg rest slide rail, and a second lead screw nut mechanism is disposed between the lower support plate and the upper support plate and is able to drive the upper support plate to move along the leg rest slide rail.

2. The low-posture zero-gravity seat frame capable of being adjusted in multiple directions according to claim 1, wherein the first toothed plate driving device comprises a dip angle adjustment toothed plate and a dip angle adjustment motor, the dip angle adjustment motor is fixed on the front horizontal tube through a dip angle adjustment motor fixing bracket, the front horizontal tube is welded and fixed between the two side plates, an output shaft of the dip angle adjustment motor is sleeved with a first driving gear, the dip angle adjustment toothed plate is a fan-shaped plate, one end of the dip angle adjustment toothed plate is hinged and installed on the front horizontal tube through a center hole, an upper end of the right front connecting rod is hinged to the other end of the dip angle adjustment toothed plate, arc-shaped teeth of the dip angle adjustment toothed plate face forward, the first driving gear is engaged with the dip angle adjustment toothed plate, and a dip angle adjustment connecting plate is fixedly connected between the second left front connecting rod and the dip angle adjustment toothed plate; and when the dip angle adjustment motor drives the first driving gear to rotate, the first driving gear drives the dip angle adjustment toothed plate to rotate around the front horizontal tube, the right front connecting rod is driven to rotate when the dip angle adjustment toothed plate rotates, and the dip angle adjustment toothed plate and the right front connecting rod rotate synchronously to adjust a height position of the front horizontal tube, such that the dip angle of the seat framework is adjusted.

3. The low-posture zero-gravity seat frame capable of being adjusted in multiple directions according to claim 1, wherein the second toothed plate driving device comprises a height adjustment toothed plate and a height adjustment motor, the height adjustment toothed plate is a fan-shaped plate, one end of the height adjustment toothed plate is welded and fixed on the rear horizontal tube through a center hole, the rear horizontal tube is hinged and installed between the two side plates, the other end of the height adjustment toothed plate is hinged to the left slide rail rear bracket, arc-shaped teeth of the height adjustment toothed plate face forward, the height adjustment motor is fixed on the side plate on the left through a height adjustment motor fixing bracket, an output shaft of the height adjustment motor is sleeved with a second driving gear, and the second driving gear is engaged with the height adjustment toothed plate; and when the height adjustment motor drives the second driving gear to rotate, the second driving gear drives the height adjustment toothed plate to drive the rear horizontal tube to rotate with respect to the side plates, the height adjustment toothed plate is driven to rotate around the left side rail rear bracket, and a height position of the rear horizontal tube is adjusted when the height adjustment toothed plate rotates, such that the height of the seat framework is adjusted.

4. The low-posture zero-gravity seat frame capable of being adjusted in multiple directions according to claim 1, wherein the first lead screw nut mechanism is composed of a first electric lead screw and a first nut, the first nut is fixed on the front horizontal tube, a screw rod of the first electric lead screw is sleeved with the first nut, and a lower end of the driven rod is hinged to a motor of the first electric lead screw; and when the motor of the first electric lead screw drives the screw rod to rotate, the first electric lead screw moves linearly with respect to the first nut, to drive the driven rod 28 to rotate, which in turn drives the leg rest cross-bar to rotate.

5. The low-posture zero-gravity seat frame capable of being adjusted in multiple directions according to claim 1, wherein the second lead screw nut mechanism is composed of a second electric lead screw and a second nut, an extension direction of a screw rod of the second electric lead screw is identical with an extension direction of the leg rest slide rail, and the second nut is disposed around the screw rod and is fixed to the upper support plate; and when a motor of the second electric lead screw drives the screw rod to rotate, the second nut moves in the extension direction of the screw rod, such that the upper support plate is driven to move forward and backward along the leg rest slide rail.

6. The low-posture zero-gravity seat frame capable of being adjusted in multiple directions according to claim 5, wherein the leg rest slide rail is a plastic slide rail, which is made of a plastic plate with honeycomb hollows, bolt holes are formed in the plastic slide rail, guide holes extending forward and backward are formed in the upper support plate, and connecting bolts penetrate through the guide holes to be fixed in the bolt holes, such that the upper support plate and the plastic slide rail are slidably connected.

7. The low-posture zero-gravity seat frame capable of being adjusted in multiple directions according to claim 2, wherein a first arc-shaped positioning hole is formed in the dip angle adjustment toothed plate and is concentric with the dip angle adjustment toothed plate, a first hinge pin inserted into the first arc-shaped positioning hole is disposed on the dip adjustment motor fixing bracket, and when the dip angle adjustment toothed plate is driven to rotate, the first hinge pin rotates along the first arc-shaped positioning hole.

8. The low-posture zero-gravity seat frame capable of being adjusted in multiple directions according to claim 7, wherein fixed shaft sleeves are correspondingly welded to inner sides of the two side plates, two ends of the front horizontal tube respectively penetrate through the two fixed shaft sleeves to be welded to the corresponding side plates, one end of a dip angle adjustment motor electrolytic plate is welded to the fixed shaft sleeve on the right, the other end of the dip angle adjustment motor electrolytic plate is fixed to the dip angle adjustment motor fixing bracket, the first driving gear and the dip angle adjustment toothed plate are engaged between the dip angle adjustment motor electrolytic plate and the dip angle adjustment motor fixing bracket, a hole allowing the output shaft of the dip angle adjustment motor to penetrate through is formed in a middle of the dip angle adjustment motor electrolytic plate, and the first hinge pin is fixedly connected to the dip angle adjustment motor electrolytic plate after penetrating through the first arc-shaped positioning hole.

9. The low-posture zero-gravity seat frame capable of being adjusted in multiple directions according to claim 3, wherein a second arc-shaped positioning hole is formed in the height adjustment toothed plate and is concentric with the height adjustment toothed plate, a second hinge pin is disposed on the side plate on the left and is inserted into the second arc-shaped positioning hole, and when the height adjustment toothed plate is driven to rotate, the second hinge pin rotates along the second arc-shaped positioning hole.

10. The low-posture zero-gravity seat frame capable of being adjusted in multiple directions according to claim 9, wherein a height adjustment motor electrolytic plate covering the second driving gear is disposed between a free end of the second hinge pin and an inner side of the side plate on the left, and a hole allowing the output shaft of the height adjustment motor to penetrate through is formed in a middle of the height adjustment motor electrolytic plate.

\* \* \* \* \*